United States Patent [19]

Honds et al.

[11] Patent Number: 4,602,848
[45] Date of Patent: Jul. 29, 1986

[54] OPTICAL APPARATUS WITH 5-DEGREE OF-FREEDOM POSITIONING DEVICE

[75] Inventors: Leo Honds; Karl H. Meyer, both of Aachen, Fed. Rep. of Germany

[73] Assignee: U.S. Philips Corporation, New York, N.Y.

[21] Appl. No.: 740,292

[22] Filed: May 31, 1985

Related U.S. Application Data

[63] Continuation of Ser. No. 533,380, Sep. 16, 1983, abandoned.

[30] Foreign Application Priority Data

Sep. 16, 1982 [DE] Fed. Rep. of Germany ....... 3234288

[51] Int. Cl.$^4$ .......................... G02B 7/04; H02K 3/28
[52] U.S. Cl. ...................... 350/247; 310/10; 310/12; 318/115; 350/255
[58] Field of Search ............... 350/247, 252, 255; 369/44-45; 318/653, 115, 135, 495, 523, 687; 310/10, 12

[56] References Cited

U.S. PATENT DOCUMENTS

| | | | |
|---|---|---|---|
| 3,243,238 | 3/1966 | Lyman | 318/687 |
| 3,373,272 | 3/1968 | Saraga | 310/10 |
| 3,745,433 | 7/1973 | Kelby, Jr. et al. | 318/115 |
| 3,851,196 | 11/1974 | Hinds | 310/12 |
| 4,386,823 | 6/1983 | Musha | 350/255 |
| 4,394,755 | 7/1983 | Givzen | 369/45 |
| 4,421,997 | 12/1983 | Forys | 318/115 |
| 4,453,241 | 6/1984 | Vad de Veerdonk et al. | 369/112 |
| 4,462,096 | 7/1984 | Kusaka | 369/45 |
| 4,514,674 | 4/1985 | Hollis, Jr. et al. | 318/135 |

FOREIGN PATENT DOCUMENTS

| | | | |
|---|---|---|---|
| 50333 | 3/1982 | Japan | 369/45 |
| 66536 | 4/1982 | Japan | 369/44 |
| 45631 | 3/1983 | Japan | 369/44 |

*Primary Examiner*—William H. Punter
*Attorney, Agent, or Firm*—David R. Treacy

[57] ABSTRACT

A positioning device for positioning an element, such as an optical element used to direct a radiation beam with respect to tracks on a carrier, with respect to translation along three mutually perpendicular axes and pivoting about two of those axes. Two sets of coils are disposed one at each end of a permanent magnet structure, each set having at least three coils having axes generally parallel to the structure axis, and arranged to co-act with the external return field of the magnet structure such that selective electrically energizing of two or more of the coils will produce a reaction force in the structure for positioning the structure in one or more of the selected degrees of freedom.

36 Claims, 19 Drawing Figures

OPTICAL APPARATUS WITH 5-DEGREE OF-FREEDOM POSITIONING DEVICE

This is a continuation of application Ser. No. 533,380, filed Sept. 16, 1983, now abandoned.

BACKGROUND OF THE INVENTION

The invention relates to an optical apparatus for deflecting or positioning a radiation beam relative to recording and reproducing tracks in an information carrier, which apparatus comprises an objective whose position relative to the information carrier can be corrected continually by means of an actuating device, which device comprises an adjustable objective support which is responsive in a magnetic field and stationary coils which adjust the objective support in the magnetic field by electrical energization.

For inscribing and reading rotating information-carrying discs the light beam must be aimed accurately at the desired track. This is effected by means of an electrical correction system which influences the objective support and thereby aims the focused light beam at the desired track.

Netherlands Patent Application 81 03 305 to which co-pending U.S. patent application Ser. No. 13,701, now U.S. Pat. No. 4,561,081, assigned to the assignee of the instant application, corresponds, describes an optical apparatus for deflecting or positioning a light beam, in which the write or read beam is incident on the record carrier perpendicularly to its surface at the correct location and at the correct instant. At the same time the objective is maintained at the correct distance from the record-carrier surface. This is achieved in that the write or read beam can be shifted along three mutually perpendicular axes and is also pivotable about two of these three axes. Thus the beam may be said to have five degrees of freedom.

For the correct positioning of the objective the objective is suspended so as to be freely movable and forces for the movements along or about the five axes are applied by means of a plurality of actuators.

These actuators comprise coils which produce magnetic fields which position the objective correctly. One of the optical apparatuses described employs nine actuators in total, comprising five permanent magnets and nine coils. The permanent magnets of all the nine actuators are arranged on the movable objective support. All the systems can be actuated simultaneously.

The use of five permanent magnets to be mounted on the objective support in the correct position and the necessity of providing nine actuators render the optical apparatus mechanically and electrically intricate.

SUMMARY OF THE INVENTION

It is the object of the invention to provide an optical apparatus a five-degree-of-freedom positioning device which employs a smaller number of actuators and which is of a simpler construction.

According to the invention this object is achieved in that the device comprises a permanent-magnetic sleeve which is provided with magnet poles and in that two axially spaced sets of coils are arranged in the external return field in such a manner that the coil fields at the axial sleeve ends act independently on the sleeve with control components in three mutually perpendicular directions in conformity with their energization.

Thus, the number of actuators may be reduced to two coil sets of three coils each which cooperate with a common permanent magnet system. In this way it is no longer necessary to mount several separate permanent magnets and the actuators are simplified substantially. The sole permanent-magnet system constitutes the movable part of the actuating device, in which the objective is mounted in a mechanically rigid manner.

A three-dimensional coordinate system x-y-z may be used to describe to the directions of movement of the sleeve of the positioning device. The x-y-z system is stationary relative to the positioning device. The relationship of the system to a rotary information-carrying disc is as follows:

The z-axis extends parallel to the axis of rotation of the information-carrying disc; that is, the z-axis is the direction along which the distance of an objective relative to the information carrier is changed (focusing).

The x-axis extends perpendicularly to the axis of rotation of the information-carrying disc and corresponds to the radial direction of the information-carrying disc.

The y-axis also lies in a plane perpendicular to the axis of rotation of the information-carrying disc and corresponds to the tangential direction of the information-carrying disc.

The three translational movements and the two rotations define three forces Fx, Fy and Fz along three coordinate axes (x, y, z) and two torques Mx and My about two of the three coordinate axes (x, y). This is simply achieved in that the coils of the actuators are arranged in the external return field of the permanent-magnetic sleeve, namely at the location where the field lines of the permanent-magnetic field are oriented so that the force vectors of the Lorentz force have the correct directions.

For the generation of the three forces and two torques a system comprising at least six separate coils is employed. Each coil produces a force vector, the entire coil system producing six force vectors. The desired three forces along the coordinate axes and the two torques are derived from the six separate forces produced by the six coils. The six coils are arranged in two groups of three in transverse planes (that is, planes perpendicular to the central or z axis) near the two sleeve ends. At these locations the magnetic field lines have the desired directions. The coils are constructed as flat air-core coils. Each coil covers an arc of 120 degrees (the three coils together covering the entire circumference).

In a further embodiment of the invention four coils are arranged in radial a transverse plane near each respective sleeve end. Each coil covers a sector of 90 degrees.

In this 8-coil system eight separate forces are produced, from which the three forces along the coordinate axes and the two torques are derived.

In a different embodiment of the invention the coils are not constructed as flat coils but as coil preforms which are curved in conformity with the pattern of the permanent-magnet field, i.e. their shape is adapted to the 3-dimensional shape of the permanent-magnet field in such a way that the Lorentz force is maximal (For this purpose the back of the coil that is, the part or leg which is farthest from the sleeve), which also produces a force, must be arranged in areas with a minimal field strength. Preferably, the coil axes are generally parallel to the sleeve axis.

In another embodiment of the invention the permanent-magnetic sleeve is of polygonal (for example, square) cross-section and the shapes of the associated coils are adapted to the shape of the polygonal sleeve. Again the coil systems may comprise three or four coils and may be constructed as flat coils or coil preforms having axes generally parallel to the sleeve axis.

In a further embodiment of the invention the sleeve of circular or polygonal cross-section is magnetized inhomogeneously. This means that the magnet poles are not necessarily located on the end faces of the sleeve but may be situated entirely or partly on the circumferential surface. An inhomogeneous magnetization is suitable for influencing the pattern of the magnetic field lines.

In yet another embodiment of the invention the coils are arranged in a cylindrical configuration around the circumferential surface of the sleeve and the sleeve is constructed so that the backs of the coils are disposed in a field area where the field strength is minimal.

In a further embodiment of the invention the sleeve comprises a plurality of axial portions. One possible version comprises two short magnets which are interconnected by a high permeability magnetic intermediate portion. Another possible version comprises a non-magnetic intermediate portion. The two versions may have advantages with respect to the magnetic field patterns.

Both versions may have two variants as regards the direction of magnetization: the magnets may be magnetized oppositely or in the same sense. In each case the external fields have areas in which the field lines have the desired directions.

In all the variants of the magnet system and the coil system described in the foregoing the magnetic-flux pattern can be influenced simply by means of pole pieces or other flux-conducting means.

An embodiment of the invention will be described in more detail, by way of example, with reference to the drawing.

DESCRIPTION OF THE PREFERRED EMBODIMENTS

Figure 1:
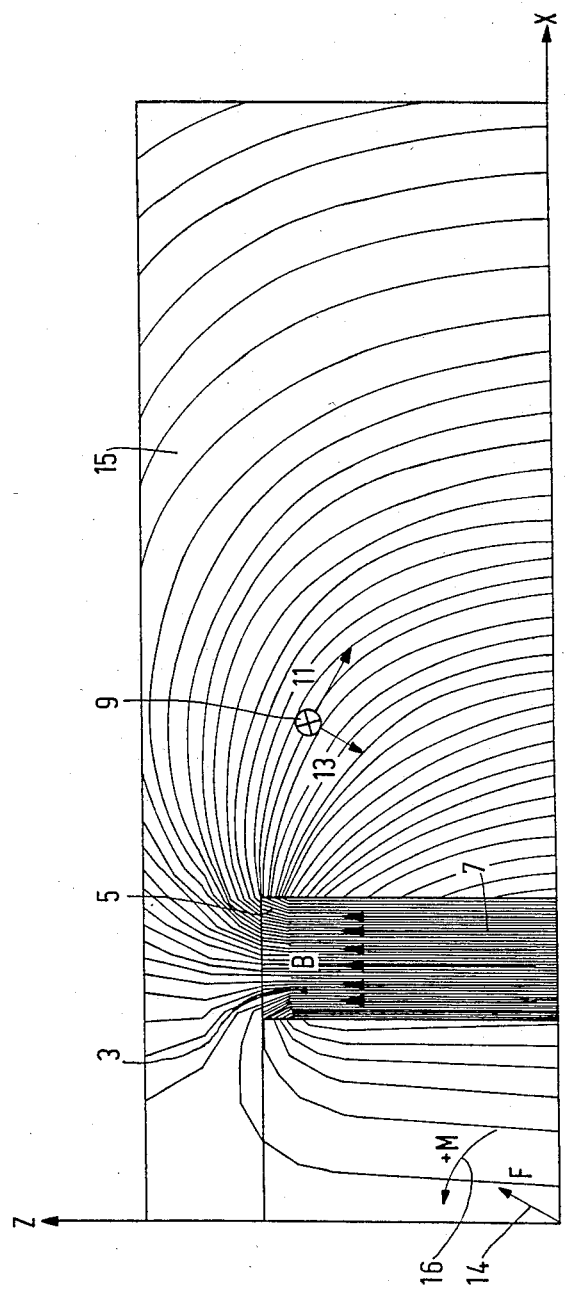
FIG. 1 is a diagrammatic view illustrating the electromagnetic principle for an axially magnetized permanent-magnetic sleeve and a conductor of a coil in an inhomogeneous return field.

FIG. 1 is a sectional view of the upper right half of an axially magnetized permanent-magnetic sleeve 3 showing the magnetic field inside the sleeve and the magnetic field outside the sleeve. Only a part of the external magnetic field is shown. The curved lines are approximated, in places, by a series of straight lines due to the computer simulation used to generate the field lines. The upper right corner is indicated by the reference numeral 5. The sleeve is of a permanent-magnet material and is axially magnetized in the direction indicated by the arrow 7.

The basic relationship between the current direction, the field-line direction and the force direction (Lorentz force) is indicated for a conductor 9. If a current I in the conductor 9 flows into the plane of drawing and the magnetic field at this location is oriented as indicated by the arrow 11, a Lorentz force will be exerted on the conductor in the direction indicated by the arrow 13. The direction of this force is perpendicular to the conductor axis and perpendicular to the direction of the flux lines. An equal counter-force is exerted on the sleeve 3, which counter-force has a direction opposite to that indicated by the arrow 13.

The conductor 9 is arranged in such a manner that the direction along which the counter-force acts does not pass through the center of gravity of the sleeve. The moment arm between the force and the center of gravity causes the application of a torque; that is, both a force 14 and a torque 16 are exerted on the permanent magnetic sleeve 3 by the conductor 9 shown in the example of FIG. 1. Thus, by suitably arranging the conductors in the inhomogeneous magnet field it is possible to generate force vectors and torques which are directed substantially as desired.

If it is possible to arrange all the coil conductors in the external return field 15 in the above-mentioned manner an optimum influence can be exerted on the sleeve 3. However, this optimum result cannot be achieved in practice. The values obtained will be average values. In any case, the sleeve 3 can be positioned in the field by energizing field coils when the coils are suitably arranged in the external magnetic field 15 of the permanent-magnetic sleeve 3.

Figure 2B:
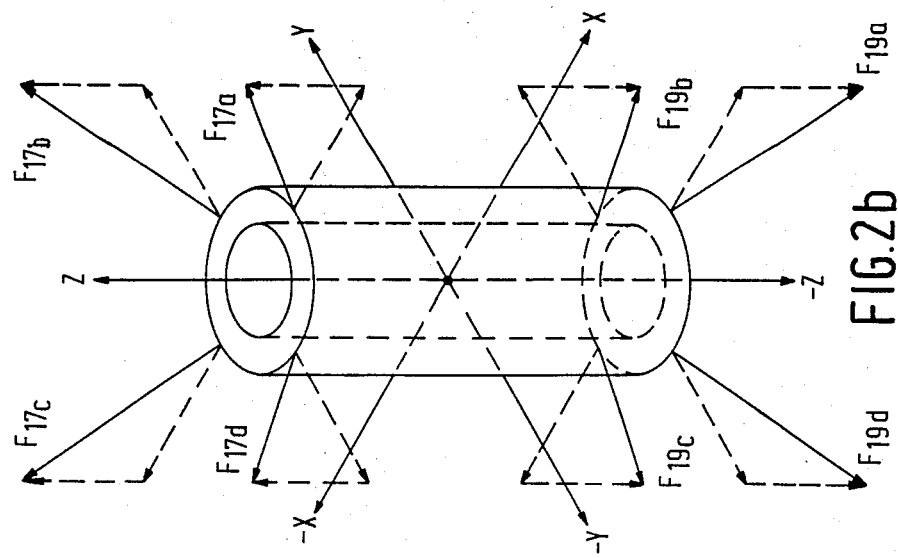
FIGS. 2a and 2b are diagrams showing the force vectors and currents for a coil arrangement comprising two planar coil systems near the axial sleeve ends, using four coils per coil system, FIGS. 3a and b are diagrams showing the force vectors and currents for a coil arrangement comprising two planar coil systems near the axial sleeve ends, using three coils per coil system.
Figure 2A:
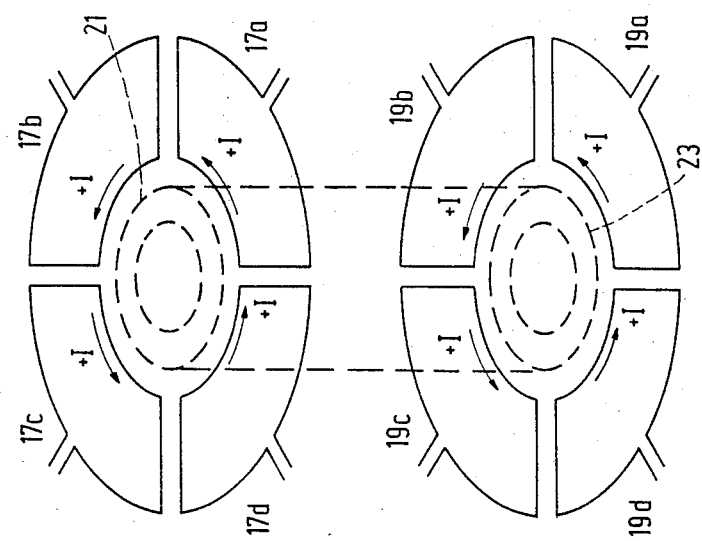

FIG. 2a shows an arrangement comprising four coils per coil set. The coils 17a to 17d and 19a to 19d are arranged in parallel superimposed transverse planes substantially at the location of the axial sleeve ends 21, 23. Relative to the x-y-z coordinate system shown in FIG. 2b the coils 17a–d and 19a–d are arranged in such a way that the coil centers of the coils 17a and 19a coincide with the +x coordinate, the coil centers of the coils 17b and 19b coincide with the +y coordinate, the coil centers of the coils 17c and 19c coincide with the −x coordinate, the coil centers of the coils 17d and 19d coincide with the −y coordinate.

As is apparent from FIG. 2, this yields the following field distributions and possibilities for positioning the sleeve 3. If the current in each of the coils 17a to 17d and 19a to 19d respectively is directed in the counter-clockwise direction inside the coils (FIG. 2a; hereinafter referred to as the positive current direction), the resulting force components F17a to F17d and F19a to F19d which act on this sleeve comprise components having different directions (FIG. 2b and Table 1).

TABLE 1

Force F17a comprises components in the +x and the +z direction
Force F17b comprises components in the +y and the +z direction
Force F17c comprises components in the −x and the +z direction
Force F17d comprises components in the −y and the +z direction
Force F19a comprises components in the +x and the −z direction
Force F19b comprises components in the +y and the −z direction
Force F19c comprises components in the −x and the −z direction
Force F19d comprises components in the −y and the −z direction.

The desired resultant forces in the x, the y and the z direction respectively are obtained by addition of the appropriate coil force components. For example, in order to obtain a resultant force in the +z direction, a current in the positive direction must be sent through the coils 17a to 17d and a current in the negative direction through the coils 19a to 19d, the addition of the coil-force components corresponding to Table 1 yielding a resultant force in the +z direction, while the sum of the force components in the x or the y direction is zero for each direction. Thus, for the force in the z-direction all the eight coils are active.

In order to obtain a resultant force in the x or the y direction or a rotation about the x or the y axis, four coils are active, as can be seen in Table 2.

TABLE 2

| desired direction of movement | current direction in coil | | | | | | | |
|---|---|---|---|---|---|---|---|---|
| | 17a | 17b | 17c | 17d | 19a | 19b | 19c | 19d |
| movement in the +z direction | +I | +I | +I | +I | −I | −I | −I | −I |
| movement in the +x direction | +I | O | −I | O | +I | O | −I | −O |
| movement in the +y direction | O | +I | O | −I | O | +I | O | −I |
| clockwise rotation about the x-axis | O | +I | O | −I | O | −I | O | +I |
| clockwise rotation about the y-axis | −I | O | +I | O | +I | O | −I | O |

+I = positive current direction
−I = negative current direction

FIG. 3 shows an arrangement comprising three coils per coil set. The coils 117a to 117c and 119a to 119c are situated in mutually parallel superimposed radial planes, substantially at the location of the axial sleeve ends 21, 23. Relative to the x-y-z coordinate system the coils 117 and 119 are arranged so that for example the coil centers of the coils 117a and 119a are shifted 30° counterclockwise relative to the +x coordinate, the coil centers of the coils 117b and 119b are shifted 60° counterclockwise relative to the +y coordinate, and the coil centers of the coils 117c and 119c coincide with the y coordinate.

Figure 3B:
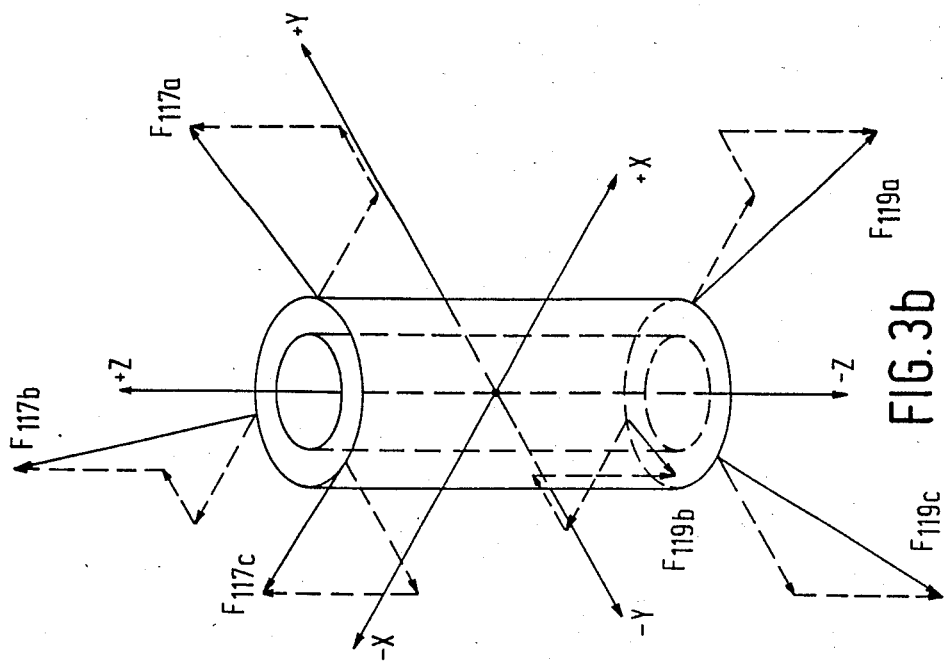
Figure 3A:
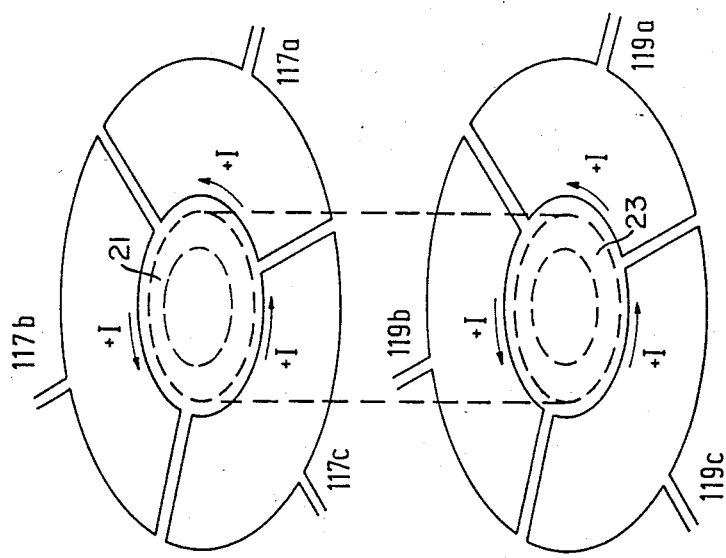

If the direction of a current I through each of the coils 117a to 117c and 119a to 119c respectively is counterclockwise (FIG. 3a; hereinafter referred as the positive current direction), inside the coil the resulting force components F117a to F117c and F119a to F119c which act on the sleeve comprise components with different directions (FIG. 3b and Table 3).

TABLE 3

Force components in a 6-coil system

Force F117a comprises components in the +x and the +y and the +z direction
Force F117b comprises components in the −x and the +y and the +z direction
Force F117c comprises components in the −y and the +z direction
Force F119a comprises components in the +x and the +y and the −z direction
Force F119b comprises components in the −x and the +y and the −z direction
Force 119c comprises components in the −y and the −z direction The desired resultant forces in the x, the y and the z direction respectively are now obtained by addition of the appropriate coil force components. The magnitude and direction of the currents in the individual coils must be selected so that the resulting force comprises only one component in the desired direction and the components in the other directions cancel each other.

Figure 4:
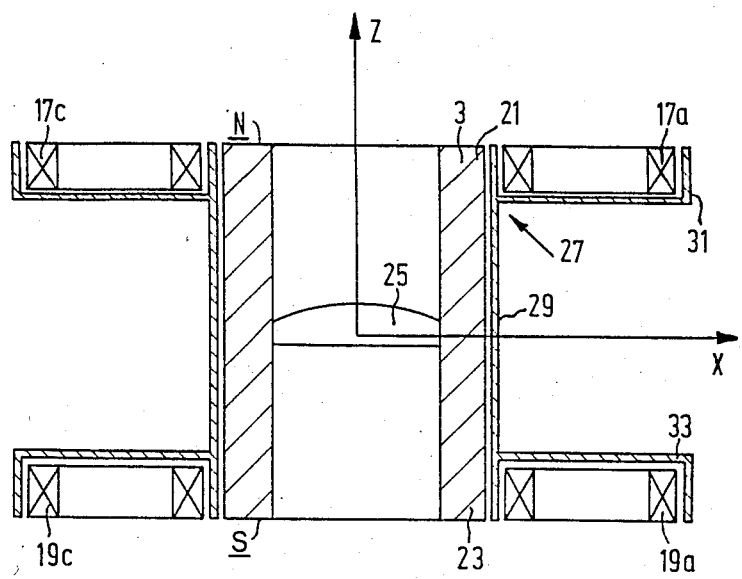
FIG. 4 is a longitudinal section of an objective support having a three-dimensional arrangement of the coils and the permanent-magnetic sleeve.

FIG. 4 is a sectional view of the optical apparatus comprising the axially magnetized permanent-magnetic sleeve 3 with magnetic poles N and S, the optical system 25 which is fixed in the sleeve, and the coils 17 and 19 at the location of the axial sleeve ends 21 and 23. As can be seen in FIG. 2 and FIG. 3 such a construction comprises eight coils and six coils respectively for positioning the permanent-magnetic sleeve 3, which coils together influence the permanent-magnetic sleeve 3. Thus, there are eight or six actuator coils and only one actuator magnet. This construction is extremely simple.

The coils are mounted in a coil form 27, in whose hollow tubular core 29 the permanent magnetic sleeve 3 is freely suspended so as to be movable. The coils 17, 19 and 117, 119 respectively are arranged in the radial flanges 31 and 33 of the coil form 27, which functions as a housing for the coils. In the present embodiment the coils 17 and 19 are air-core coils.

Figure 5A:
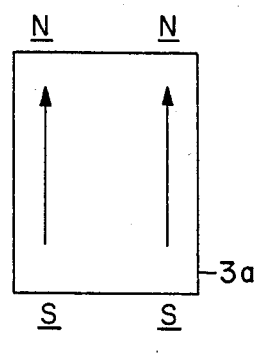
FIGS. 5a–c are diagrammatic views of examples of different magnetizations of the sleeve.
Figure 5B:
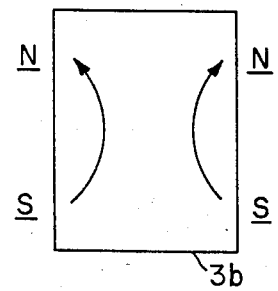
Figure 5C:
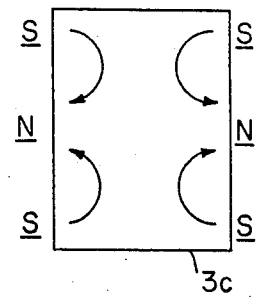

FIGS. 5a to c show examples of different magnetizations of the sleeve. In the individual figures:

FIG. 5a shows a sleeve 3a which is homogeneously magnetized in the axial direction, FIG. 5b shows an inhomogeneously magnetized sleeve 3b having two annular poles around the circumference, and FIG. 5c shows a sleeve 3c with three annular poles on the circumference of the sleeve.

Figure 6A:
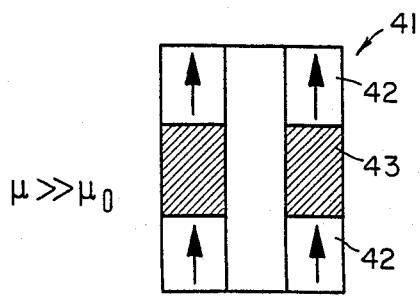
FIGS. 6a–h are diagrammatic views of examples of sleeves with different magnetizations, the sleeve comprising two magnets and an intermediate portion.
Figure 6B:
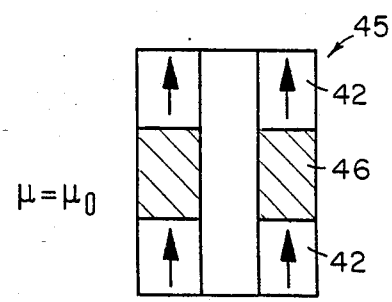
Figure 6C:
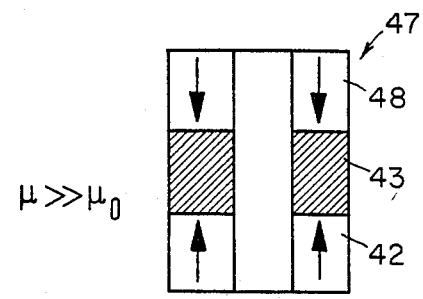
Figure 6D:
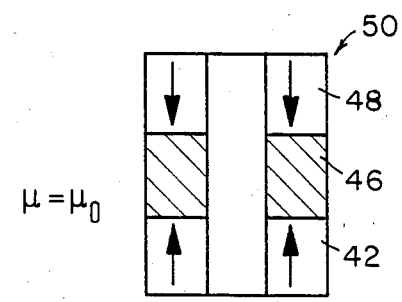
Figure 6E:
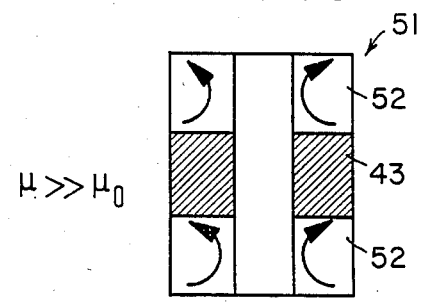
Figure 6F:
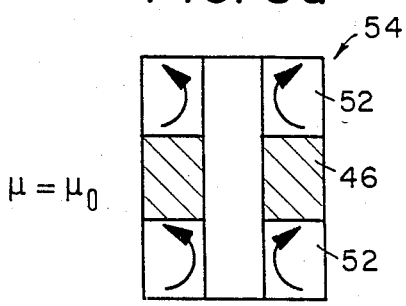
Figure 6G:
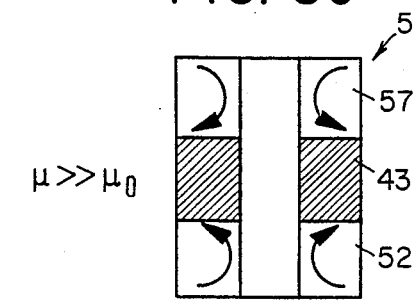
Figure 6H:
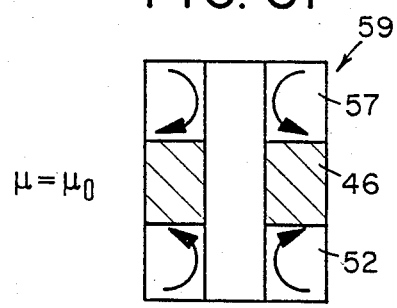

FIG. 6 shows examples of an arrangement in which the sleeve comprises two magnets with different magnetizations and an intermediate portion of a high permeability soft magnetic or a non-magnetic material. In the individual Figures:

FIG. 6a shows a sleeve 41 having axially magnetized and similarly oriented magnets 42 and a magnetic intermediate sleeve 43, FIG. 6b shows a sleeve 45 having axially magnetized and similarly oriented magnets 42 with a non-magnetic intermediate sleeve 46, FIG. 6c shows a sleeve 47 having axially magnetized and oppositely oriented magnets 42, 48 and a magnetic intermediate sleeve 43, FIG. 6d shows a sleeve 50 having axially magnetized and oppositely directed magnets 42, 48 and a non-magnetic intermediate sleeve 46, FIG. 6e shows a sleeve 51 having laterally magnetized and similarly oriented magnets and a magnetic intermediate sleeve 43, FIG. 6f shows a sleeve 51 having laterally magnetized and similarly oriented magnets 52 and a non-magnetic intermediate sleeve 46, FIG. 6g shows a sleeve 56 having laterally magnetized and oppositely oriented magnets 52, 57 and a non-magnetic intermediate sleeve 43, and FIG. 6h shows a sleeve 59 having laterally magnetized and oppositely directed magnets 52, 57 and a non-magnetic intermediate sleeve 46.

Figure 7:
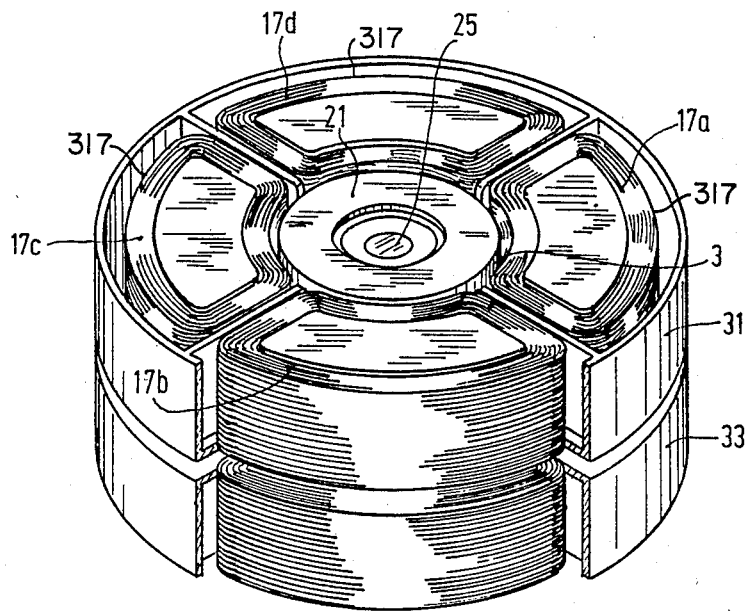
FIG. 7 is a perspective view of an objective support similar to FIG. 4.

FIG. 7 shows in greater detail the layout of coils 17a-d in a coil form or housing 31. The individual coils are constructed as coil preforms having a three-dimensional shape adapted to the shape of the magnet sleeve so as to maximize the Lorentz forces. The back or outer part 317 of each coil is thus arranged as far as reasonably possible from the sleeve 203 so as to be in an area of minimal magnetic field strength.

Figure 8:
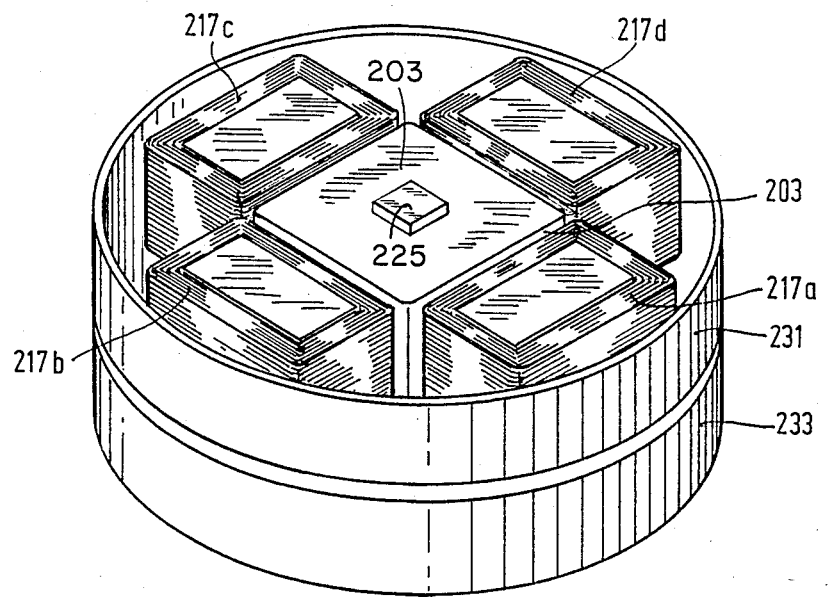
FIG. 8 is a perspective view of a five-degree-of-freedom positioning device for a square cross-section element, in accordance with the invention.

FIG. 8, similar to FIG. 7, shows a supporting device for a square-cross-section magnet structure 203 on which an element 225 is mounted. Coil preforms 217a-d have a three-dimensional shape adapted to the square sleeve shape and that of a form or housing 231, as these would typically be shaped to maximize Lorentz forces in view of the magnetic field and power losses in the coil. An identical second set of coils (not shown) are arranged in a lower housing 233.

What is claimed is:

1. An optical apparatus for deflecting or positioning a radiation beam relative to recording and reproducing tracks in an information carrier, which apparatus comprises an objective, and a positioning device for continually correcting the objective position relative to the information character, said positioning device comprising an adjustable objective support which is responsive to a magnetic field and stationary coils which are electrically energized, characterized in that the objective support comprises a permanent magnet sleeve defining an axis and having magnet poles; and said stationary coils comprise two axially spaced sets of coils arranged in the external field of the magnet sleeve, such that the coil fields at the respective axial sleeve ends act on the sleeve with control components in three mutually perpendicular directions in conformity with their energization.

2. An apparatus as claimed in claim 1, characterized in that each said set comprises at least three coils arranged outside the sleeve in transverse planes near a respective sleeve end.

3. An apparatus as claimed in claim 2, characterized in that the coils are constructed as flat air-core coils.

4. An apparatus as claimed in claim 1, characterized by comprising a coil housing having a hollow tubular core in which the sleeve is freely suspended.

5. An apparatus as claimed in claim 4, characterized in that the coils are constructed as coil preforms having axes generally parallel to said sleeve axis, said preforms having a shape adapted to the three-dimensional shape of the permanent magnetic field in such a way that the Lorentz force is maximal.

6. An apparatus as claimed in claim 5, characterized in that the sleeve is magnetized inhomogeneously.

7. An apparatus as claimed in claim 6, characterized in that the sleeve comprises two permanently magnetized axial portions, and an intermediate portion disposed between said two permanently magnetized portions.

8. An apparatus as claimed in claim 7, characterized in that said intermediate portion is formed of a non-magnetic material.

9. An apparatus as claimed in claim 1, characterized in that the coils are constructed as coil preforms having axes generally parallel to said sleeve axis, said preforms having a shape adapted to the three-dimensional shape of the permanent magnetic field in such a way that the Lorentz force is maximal.

10. An apparatus as claimed in claim 9, characterized in that the permanent-magnetic sleeve is of polygonal cross-section and the shapes of the associated coils are adapted to the shape of the polygonal sleeve.

11. An apparatus as claimed in claim 10, characterized in that the sleeve is magnetized inhomogeneously.

12. An apparatus as claimed in claim 11, characterized in that the sleeve comprises two permanently magnetized axial portions, and an intermediate portion disposed between said two permanently magnetized portions.

13. An apparatus as claimed in claim 12, characterized in that said intermediate portion is formed of a non-magnetic material.

14. An apparatus as claimed in claim 1, characterized in that the permanent-magnetic sleeve is of polygonal cross-section and the shapes of the associated coils are adapted to the shape of the polygonal sleeve.

15. An apparatus as claimed in claim 14, characterized in that the backs of the coils are arranged in a field area where the field strength is minimal.

16. An apparatus as claimed in claim 15, characterized in that the sleeve is magnetized inhomogeneously.

17. An apparatus as claimed in claim 16, characterized in that the sleeve comprises two permanently magnetized axial portions, and an intermediate portion disposed between said two permanently magnetized portions.

18. An apparatus as claimed in claim 17, characterized in that said intermediate portion is formed of a non-magnetic material.

19. An apparatus as claimed in claim 1, characterized by comprising a coil housing having a hollow tubular core in which the sleeve is freely suspended, and in that the sleeve is magnetized inhomogeneously.

20. An apparatus as claimed in claim 19, characterized in that the sleeve comprises two permanently magnetized axial portions, and an intermediate portion disposed between said two permanently magnetized portions.

21. An apparatus as claimed in claim 20, characterized in that said intermediate portion is formed of a non-magnetic material.

22. An apparatus as claimed in claim 1, characterized in that the magnetic poles of the axially magnetized sleeve are located on its faces.

23. An apparatus as claimed in claim 22, characterized in that each said set comprises at least three coils arranged outside the sleeve in transverse planes near a respective sleeve end.

24. An apparatus as claimed in claim 23, characterized in that the coils are arranged in a cylindrical configuration around the sleeve circumference, and the backs of the coils are arranged in a field area where the field strength is minimal.

25. An apparatus as claimed in claim 1, characterized in that the coils are arranged in a cylindrical configuration around the sleeve circumference, and the backs of the coils are arranged in a field area where the field strength is minimal.

26. An apparatus as claimed in claim 1, characterized in that the sleeve is magnetized inhomogeneously.

27. An apparatus as claimed in claim 26, characterized in that the sleeve comprises two permanently magnetized axial portions, and an intermediate portion disposed between said two permanently magnetized portions.

28. An apparatus as claimed in claim 27, characterized in that said intermediate portion is formed of a non-magnetic material.

29. A five-degree-of-freedom positioning device for an element, comprising
a permanent magnet structure defining an axis and having magnetic poles, said element being mounted to said structure, and
two axially spaced sets of coils arranged in the external return field of the magnet structure such that the coil fields at respective axial ends of the structure act on the structure with control components in three mutually perpendicular directions in conformity with the energization of the respective coils.

30. A device as claimed in claim 29, characterized in that said structure has two end faces each perpendicular to the axis, the magnet poles being located in the respective faces, and
each said set comprises at least three coils arranged outside the structure in transverse planes near a respective structure end.

31. An apparatus as claimed in claim 29, characterized in that the coils are arranged in a cylindrical configuration around the structure circumference, and the backs of the coils are arranged in a field area where the field strength is minimal.

32. An apparatus as claimed in claim 31, characterized in that the structure is magnetized inhomogeneously.

33. An apparatus as claimed in claim 32, characterized in that the structure comprises two permanently magnetized axial portions, and an non-magnetic intermediate portion disposed between said two permanently magnetized portions.

34. An apparatus as claimed in claim 29, characterized in that the structure is magnetized inhomogeneously.

35. An apparatus as claimed in claim 34, characterized in that the structure comprises two permanently magnetized axial portions, and an non-magnetic intermediate portion disposed between said two permanently magnetized portions.

36. An apparatus as claimed in claim 29, characterized in that the permanent-magnetic structure is of polygonal cross-section and the shapes of the associated coils are adapted to the shape of the polygonal structure.

* * * * *